3,404,719
BALLAST FOR PNEUMATIC VEHICLE TIRES
William F. Priest, Wadsworth, Ohio, and Sander Simon, New York, N.Y., assignors to Sovereign Resources, Inc., New York, N.Y., a corporation of Colorado
No Drawing. Filed Nov. 14, 1966, Ser. No. 593,626
3 Claims. (Cl. 152—330)

This invention relates generally to the field of vehicle tire ballasts of the type disclosed in U.S. Patent 2,884,039, granted Apr. 28, 1959, to William L. Hicks, and more particularly to an improved ballast material capable of providing increased weight per unit volume, with accompanying superior traction, and superior flow properties during vehicle operation.

The advantages of highly pulverized ballast materials are well known in the prior art, as exemplified in the above mentioned patent. Owing to the lightness of the individual particles, the mass of powder in the pneumatically-sealed chamber of the tire absorbs air, filling the otherwise unfilled portion thereof, to form an air-powder mixture possessed of considerably resiliency, whereby the normal deflection present in a conventional pneumatic tire is retained while utilizing the advantage of the additional vehicle weight provided by the ballast.

This system of inflation has accompanying disadvantages. It is practically impossible to inject compressed air into the tire, using conventional air compression facilities, in which less than the normal amount of moisture present in the air has been eliminated. After the tire has been filled, and with continued operation, the continuous change in operating pressure (owing to the relatively small amount of air in the tire) causes the release of a substantial portion of this moisture, which upon contact with the powder component of the ballast causes "balling" or "caking" between the particles with the result that the ballast no longer flows within the tire as required during movement, resulting in imbalance of the tire and accompanying "loping action" in the operation of the vehicle, which in extreme cases can actually cause damage to the mechanical components of the vehicle. This phenomenon is particularly true in the case of barite materials, containing large amounts of barium sulphate, and to a very substantial degree in the case of powdered clays, silicates, and similar materials.

Lead oxides and lead carbonates do not exhibit this characteristic as readily, but have a disadvantage in that they are quite toxic, and therefore undesirable from the standpoint of the operator who must fill and empty the vehicle tires. Iron oxides are normally not toxic, but because of relatively heavier densities, are not suitable for use at a fineness of 100 to 200 mesh. At this degree of coarseness, the particles are not sufficiently small so as to permit the mass to absorb air, which action is so necessary to achieve the desired result of improved resiliency of the ballast throughout the entire mass thereof. We have found that by subjecting certain classes of iron oxide to the action of a ball mill wherein substantially all of the oxide is reduced to a fineness varying from 300 to 400 mesh, with approximately 99.9 percent of the mixture at least 325 mesh, there is obtained a dense, uniform, anhygroscopic ballast material, the use of which has substantially no apparent disadvantages.

It is therefore among the principal objects of the present invention to provide an improved tractor tire or vehicle tire ballast of the powder-air mixture type, in which the disadvantages accompanying prior art materials have been substantially eliminated.

Another object of the invention lies in the provision of an improved tire ballast of the class described in which the cost fabrication may be of a relatively low order, with consequent wide sale, distribution and use.

Yet another object of the invention lies in the provision of an improved tire ballast which may be injected into and removed from vehicle tires using prior art methods, thereby requiring no change in ballast-handling equipment.

By way of illustration of the invention, the following specific example is given hereinbelow, in which the parts are set out by weight.

Black magnetic iron ore of commercial type available principally in the southwestern parts of the United States is suitably washed to remove slag, crushed to a particle size not greater than 10 mesh, and finally ball milled to a fineness where at least 99.9 percent of the same is of fineness 325 mesh or finer. This oxide, upon analysis, depending upon the particular source of the same, will normally have a total iron content of from 69 to 72 percent, with an average of approximately 70.9 percent, a ferrous oxide content of at least 22 percent, the remaining components being ferric oxide ($Fe_2O_3$), with trace amounts of manganese and copper to a maximum of .31 percent. The appearance of the material is that of a fine black powder having a specific gravity ranging from 4.1 to 4.9.

A suitable quantity of the above powder is injected into a pneumatic tractor tire to a minimum of 75 percent of its volumetric capacity, and not exceeding 95 percent thereof. The remaining space is filled with compressed air to the normal operating pressure of the particular tire. During operation of the tire at speeds not in excess of an average of five miles per hour, only several revolutions of the tire are necessary to entrain the air in the tire within the mass of the iron oxide. Owing to the increased weight of the ballast material, the air does not remain entrained within the powder upon stoppage of operation for more than a few moments, but the entraining process is immediately commenced upon resumption of operation. Substantial intermittent operation over a period of several months, without addition of air or ballast, or removal thereof, displays no development of imbalance from the initially balanced condition of the tire. Upon removal of the ballast from the tire after such period, no appreciable "caking" or "balling" is observed. This lack of coagulation is attributed to the fact that the iron oxide, being in a completely oxidized chemical condition, is inert to the presence of moisture in the air disposed within the tire chamber.

We wish it understood that we do not consider the invention limited to the precise details set forth herein, for obvious modifications will occur to those skilled in the art to which the invention pertains.

We claim:
1. In a ballasted vehicle tire having an annular sealed chamber inflated with a gas under pressure and a powder ballast filling a major portion of said chamber, the improvement comprising: said ballast consisting substantially of particulate magnetic iron oxide having a specific gravity of from 4.1 to 4.9, said oxide having a fineness of at least 325 mesh.

2. The improvement in accordance with claim 1 in which said oxide comprises a mixture of ferric oxide and ferrous oxide and has a total iron content of from 69 percent to 72 percent.

3. The improvement according to claim 2 in which the ballast ranges in fineness from 325 mesh to 400 mesh.

References Cited
UNITED STATES PATENTS
3,230,999   1/1966   Hicks _____ 152—330

ARTHUR L. LA POINT, *Primary Examiner.*
C. B. LYON, *Assistant Examiner.*